Patented Aug. 26, 1947

2,426,467

UNITED STATES PATENT OFFICE 2,426,467

GOLD-COPPER SOLDER

Richard B. Nelson, Schenectady, N. Y., assignor to General Electric Company, a corporation of New York No Drawing. Application July 18, 1945,
Serial No. 605,827

2 Claims. (Cl. 75—153)

The present invention is a gold-copper alloy suitable for use either as a solder or for making diffusion seals.

One of the objects of the present invention is to provide a solder having a melting point between 778° C. and 1082° C. the melting point of copper. A further object of the invention is the provision of an alloy solder which is adapted for use in an unpurified line hydrogen atmosphere in joining copper to copper, steel, or alloys comprising iron, nickel and cobalt and having substantially the expansion characteristics of glass. Another object of the invention is the provision of an alloy suitable for use in making diffusion seals. Other objects will appear hereinafter.

In assembling metal vacuum tubes provided with copper parts most of the soldered joints usually have been made with silver-copper eutectic solder which melts at about 778° C. It is sometimes desirable to carry out the soldering in several steps using solders of different melting points so that one joint may be made at high temperature and the next at a lower temperature without melting the first. It is desirable therefore to employ a solder for this purpose which has a melting point above 778° C. but below the melting point of copper.

Silver-copper alloys containing more silver than the utectic composition, 72% silver, 28% copper, are not suitable for high temperature solders for copper parts because they dissolve copper from such parts to form the eutectic. While some high copper alloys of the system have been used to obtain a higher melting point alloy they have the disadvantage of a very long plastic range extending down as far as the melting point of the eutectic and so do not give good mechanical strength during a subsequent soldering with the eutectic alloy. It is also known that joints produced by a 60% copper, 40% silver alloy solder fractures easily.

Pure gold has been employed heretofore for soldering to copper parts, although the melting point of gold, 1063° C. is close to that of copper. However, if gold is placed in contact with a copper structure, alloying starts at about 900° C. forming a low melting point alloy by dissolving copper from the structure. As the temperature increases, more and more copper is dissolved and the melting point of the resulting alloy rises.

The use of pure gold in soldering copper parts involves certain difficulites; first, there is the erosion of the copper parts. The parts must therefore be designed so that this loss in material is not harmful; second, alloy solders containing between 40% gold and 90% gold may go through phase transformations in the temperature range between 300° C. and 400° C. forming ordered phases ($\beta$, $\gamma$ and $\delta$) characterized by hardness and brittleness. If the alloys are quenched from around 500° C. these transformations do not occur and a ductile alloy results. However, in furnace brazing, and particularly when baking out vacuum tubes, it is impossible to do the required quenching.

In order to obtain a high temperature solder which does not depend on dissolving copper from the parts to produce the soldering alloy, I have employed an alloy containing between 5 and 40% gold with the remainder copper and preferably an alloy solder which contains 37½% gold and 62½% copper by weight. This preferred alloy composition is on the copper rich side of the brittle phases, so that, regardless of whether copper is dissolved from the parts to be joined, the alloy will have good mechanical properties. The melting range of the preferred alloy is from 950° C. to 990° C.

In order for the solder to penetrate a close-fitting joint and form smooth fillets at the corners, it is desirable to employ a furnace temperature of about 1040° C. While I have formed joints employing radio frequency heating in forming gas consisting of 95% nitrogen, and 5% hydrogen, this method of heating is somewhat objectionable since it requires very close attention because the temperature employed is very close to the melting point of copper.

Heretofore considerable trouble has been encountered in attempts to solder iron-nickel-cobalt alloys of the type above mentioned with silver solders due to the penetration of the solder into the grain boundaries of the alloys. My improved gold-copper alloy has proved to be a satisfactory solder for this purpose. I have found that when iron-nickel-cobalt alloys of the type above-mentioned are soldered with my improved gold-copper alloy the penetration of solder into the alloy is only about one to two mils.

A well known technique for sealing copper shells of vacuum tubes is to clamp the parts together with a gasket consisting of a ring of pure gold wire positioned between the copper surfaces. The clamps are tightened until the tube is vacuum tight, then while it is being pumped and is still in the clamps the tube is baked at 400° C. to 500° C. at which time the gold and copper diffuse together and form a metallic joint which remains tight after the clamps are removed. However, in the transition region between the gold and the copper there are layers of metal of the intermediate compositions and therefore at some parts of the seal the alloy apparently forms the brittle phases. After baking out a large vacuum tube of glass parts the cooling rates must necessarily be slow, so conditions are favorable for hardening the critical alloys. My improved gold-copper solder avoids this difficulty and I have used it to make strong, ductile joints by the diffusion process. In contrast to pure gold my improved gold-copper alloy is harder than annealed copper so that when joints are clamped together the copper undergoes most of the deformation.

What I claim as new and desire to secure by Letters Patent of the United States, is:

1. A solder containing 37½% gold and 62½% copper.

2. The method of making a diffusion seal between copper parts of a vacuum tube which comprises clamping a gold-copper alloy consisting of about 37½% gold with the remainder copper between said copper parts until the tube is vacuum tight, and heating the tube and alloy at a temperature of about 450° C. to diffuse a portion of said alloy into said copper parts and thereby form a seal between said parts.

RICHARD B. NELSON.

REFERENCES CITED

The following references are of record in the file of this patent:

UNITED STATES PATENTS

| Number | Name | Date |
|---|---|---|
| 1,189,194 | Eldred | June 27, 1916 |
| 2,195,314 | Lincoln | Mar. 26, 1940 |
| 2,226,944 | Reeve | Dec. 31, 1940 |
| 2,340,362 | Atlee | Feb. 1, 1944 |
| 2,398,449 | Ranci | Apr. 15, 1946 |

OTHER REFERENCES

Metals and Alloys, 3d edition, 1931, published by Louis Cassier Co., London, page 57.